UNITED STATES PATENT OFFICE.

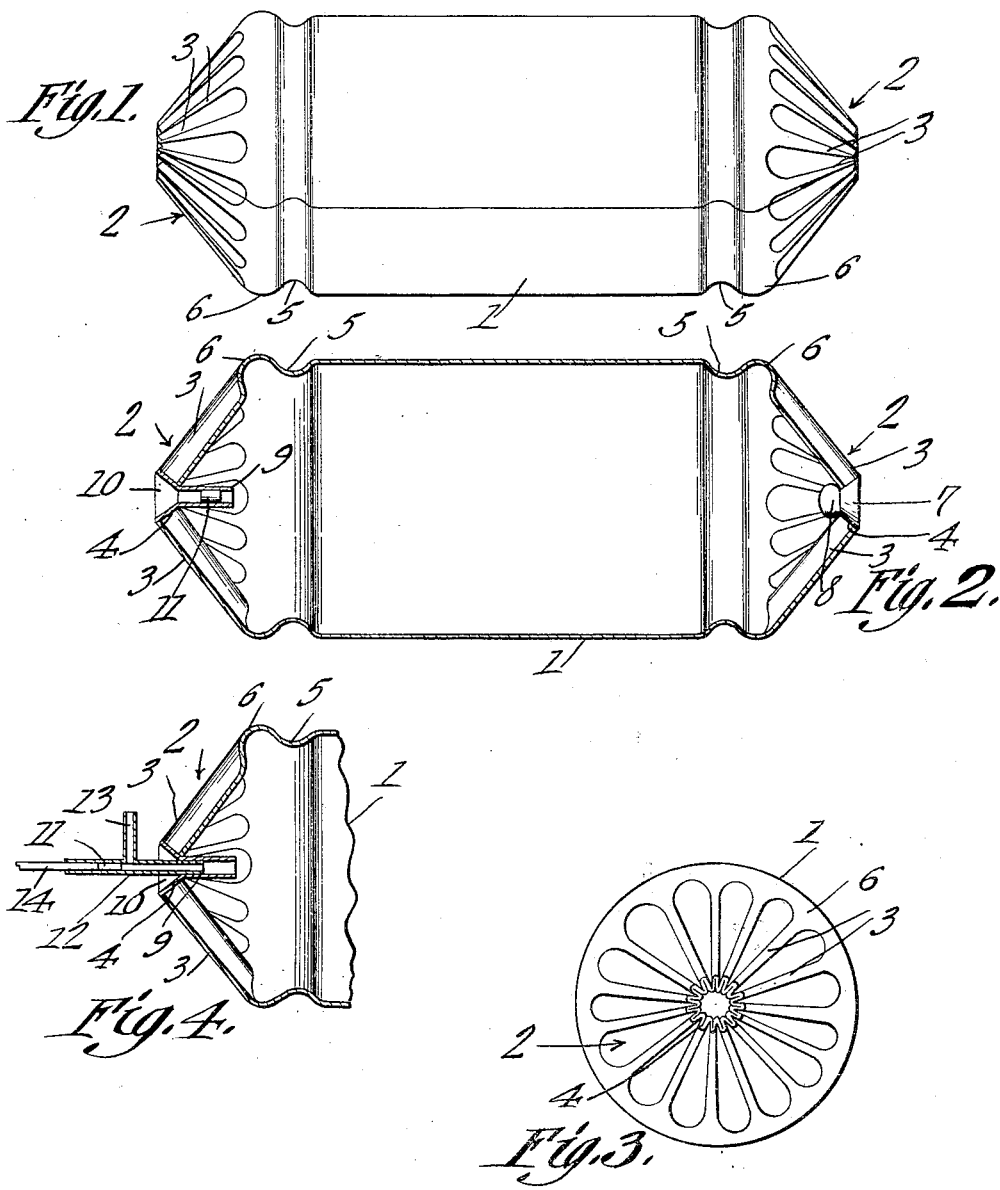

JOHN H. SHEPHERD, OF ELYRIA, OHIO.

FLOAT.

1,230,335.     Specification of Letters Patent.     Patented June 19, 1917.

Application filed January 31, 1916. Serial No. 75,383.

*To all whom it may concern:*

Be it known that I, JOHN H. SHEPHERD, a citizen of the United States, residing at Elyria, in the county of Lorain and State of Ohio, have invented a new and useful Float, of which the following is a specification.

The present invention appertains to floats, and aims to provide a novel and improved float or buoy adapted especially for use in connection with fishing nets, lines, and the like, although adapted for various other uses.

It has not been infrequently the case, with the use of ordinary fishing floats, that they have collapsed during the use thereof, and which is of course detrimental, since when a float collapses it is rendered useless. Attempts have been made to overcome this objection by strengthening the construction of the float, by increasing the thickness of the metal from which it is constructed, and other attempts have been made to overcome said objection, but to no avail with marked success.

It is the object of this invention to provide a float or buoy so constructed, that it will effectively withstand the conditions to which it is subjected in use, without danger of collapsing, the invention residing particularly in the manner of forming the ends of the float whereby the float is strengthened materially.

It is also within the scope of the invention to provide a float having the features above noted, and which at the same time, is comparatively simple, nonencumbering and inexpensive in construction, which may be readily manufactured, and which will serve its office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved float.

Fig. 2 is a longitudinal section thereof.

Fig. 3 is an end view of the float with the near aperture open.

Fig. 4 is a fragmental section of one end of the float, illustrating the means for forcing air into the float, and for closing or stopping up the respective end of the float after the float has been inflated.

In carrying out the invention, the shell or casing 1 of the float is formed from suitable sheet metal of cylindrical form, which may be devoid of a seam, or which may be formed from a blank having its edges secured together to provide a longitudinal seam, so long as the seam provides a secure joint capable of withstanding strains to which the float is subjected.

The shell 1 is provided with conical ends 2, formed by crimping ends of the shell 1, so as to draw or bring in said ends, to provide the crimps or plaits 3 which have their adjacent ends bearing together to provide the tapered or frusto-conical end apertures 4 whose smaller ends are located innermost. The plaits 3 diverge away from one another from the apertures 4, and their remote ends merge or blend into the smooth circular periphery of the shell 1. By crimping and drawing in the ends of the shell 1, seams at the ends of the float are avoided, so that the ends of the float will be integral with the body of the float to avoid a rupture therebetween.

In order to strengthen the body of the float or its shell 1, the shell 1 is provided adjacent its ends with inwardly projecting annular corrugations 5, providing the outstanding annular corrugations or beads 6 into which the remote ends of the plaits 3 merge, whereby the corrugations 5 and 6 serve to strengthen the body of the shell 1, and the crimped or corrugated ends 2.

One end aperture 4 is closed or plugged up by means of a tapered or frusto-conical plug 7 of suitable metal seated within said aperture 4, and provided at its smaller end with a head or knob 8 engaging behind or inside of the respective restricted or contracted end of the shell. The plug 7 is of such size as to fit or seat snugly within the aperture 4, and the head 8 is rounded and slightly greater in diameter that the smaller end of the aperture, whereby the head 8 will snap through the respective end of the shell when the plug 7 is forced home. Before the plug 7 is engaged to the shell, it is dipped in molten solder, in order that when the plug is forced into place, the solder will securely fasten the plug 7 within the aperture 4, and will close up the ends of the crimps 3. The head 8 being snapped through the end of the shell, will hold the plug 7 in place while the solder sets, and as soon as the solder sets, it will securely hold the plug 7 in place, and will also securely close the space between the plug 7 and the adjacent ends of the crimps 3. The adjacent ends of the crimps 3 which provide the frusto-conical aperture or seat 4, thus provide effective means for the engagement of the plug 7 to the respective end of the shell, for closing said aperture. The plug 7 fitting within the aperture 4 will serve to resist the inward pressure of the respective crimps 3, since the ends of the crimps abutting against the plug 7 cannot move inwardly. The plug 7, also, cannot be moved inwardly since it bears against the crimps 3 and is prevented from being moved inward thereby.

In order to close the other end of the shell, and to enable the shell to be inflated, a tubular nozzle 9 is slipped through the smaller end of the aperture 4, and is provided with a flared or frusto-conical mouth portion 10 seated snugly within the respective aperture 4, so that the portion 10 has the function of the plug 7, and may be soldered in a like manner within the aperture 4. The nozzle 9 and its mouth portion 10 are of funnel-like form. A plug or stopper 11 of rubber or other equivalent expansible and elastic material is fitted within the nozzle or spout 9, and is of such tension that it cannot be dislodged from the nozzle 9 by the pressures to which it is subjected.

As a means for inflating the float and for inserting the plug or stopper 11 within the nozzle 9, a tubular member 12 is employed, the same having one end inserted in the nozzle 9 before the plug 11 is inserted into said nozzle. This tubular member 12 has a radially extending branch 13 to which a suitable pump may be connected for inflating the shell, and the expansible plug 11 is fitted within the tubular member 12 at that side of the branch 13 remote from the end of the tubular member 12 which is applied to the float. Air may then be forced into the float by applying the pump to the branch 13, so that the float may be inflated, and then when the float has been suitably inflated, the plug 11 may be forced along the tubular member 12, by inserting a rod or other implement 14 to force the plug 11 into the nozzle 9, in which event, the plug 11 will immediately expand and fit tightly within the nozzle 9 to close the passage therethrough. The tubular member 12 may then be retracted or withdrawn from the float, which will leave the float in inflated condition. The float being inflated, will better withstand the hard usage incurred by the float.

The present float or buoy may be used for sustaining fishing nets, lines, and the like, and is especially adapted for such use, although the buoy or float may be employed for divers suitable purposes. This float is thoroughly substantial in construction, to avoid the accidental collapsing thereof even when the float is subjected to hard usage, which is the salient and admirable feature of the invention. The other advantages and attributes of the invention will be apparent to those versed in the art, taken in connection with the drawing, and foregoing explanation.

Having thus described the invention, what is claimed as new is:

A float embodying a shell having an indrawn crimped end providing a frusto-conical aperture, and a frusto-conical plug seatable snugly in said aperture and having a rounded head at it smaller end of slightly greater diameter than said smaller end to snap through the aperture when the plug is forced into the same.

In testimony that I claim the foregoing as my own, I have hereto affixed my signature in the presence of two witnesses.

JOHN H. SHEPHERD.

Witnesses:
 FRANK A. SMITH,
 W. M. SMITH.

Copies of this patent may be obtained for five cents each, by addressing the "Commissioner of Patents, Washington, D. C."